United States Patent [19]
Menke

[11] Patent Number: 5,621,212
[45] Date of Patent: Apr. 15, 1997

[54] TELESCOPE DOME ROTATION SYSTEM

[76] Inventor: John L. Menke, 22500 Old Hundred Rd., Barnesville, Md. 20838

[21] Appl. No.: 603,236

[22] Filed: Feb. 20, 1996

[51] Int. Cl.$^6$ .............................. G01J 5/10; G05B 11/00
[52] U.S. Cl. .................... 250/349; 250/341.1; 250/222.1
[58] Field of Search .............................. 250/341.1, 349, 250/203.1, 222.1

[56] References Cited

U.S. PATENT DOCUMENTS

| | | | |
|---|---|---|---|
| 3,421,004 | 1/1969 | Cashion | 250/203.1 |
| 4,590,410 | 5/1986 | Jönsson | 250/222.1 X |
| 5,142,152 | 8/1992 | Boiucaner | 250/349 X |

Primary Examiner—Carolyn E. Fields
Assistant Examiner—Edward J. Glick
Attorney, Agent, or Firm—John P. Halvonik

[57] ABSTRACT

The invention is a system for controlling the operation of a dome in connection with a telescope in order to maintain the slot of the dome in alignment with the telescope at all times so that stars may be viewed continuously. The system eliminates of minimizes the need for the user having to manually control the operation, usually rotation, of the dome. Preferably four infrared sensors and transmitters are mounted along the circumference of the telescope in order to send signals to a controller when the edge of the dome is detected which occurs when the signal is reflected back to the sensor. Each of the sensors should be 90° in relation to each other. Each of the sensors is in connection with a controller. The controller is in connection with the movement system of the dome and sends signals to the movement system that rotate the dome until the sensors determine that the dome slot is aligned with the telescope.

11 Claims, 3 Drawing Sheets

DOME TRAK
FOR EQUATORIAL MOUNTS

DOME TRAK
FOR EQUATORIAL MOUNTS

DOME TRAK COMPONENT DIAGRAM
2 OF 4 SENSOR PODS SHOWN

DOME TRACK SIGNAL
LOGIC DIAGRAM

TELESCOPE DOME ROTATION SYSTEM

BACKGROUND AND FIELD OF THE INVENTION

The dome control system described herein relates to the field of astronomical domes associated with telescopes and, especially, to those domes that must be rotated in order to keep the vertical dome slot, or aperture, in alignment with the telescope. Such dome control systems may be operated manually by the user in order to keep the telescope in alignment with the aperture of the dome. Many telescopes nowadays can be moved themselves, either manually or by automatic control. Because the sky is always moving to an observer on earth, such controls are necessary if the telescope is to follow the movements of a celestial body throughout the evening.

An astronomical telescope is usually installed in a rotatable dome having a slot (may be referred to as an aperture). Such telescope is aimed through the slot in order to follow, for example, a star. As the earth turns, the telescope turns to follow the star. As the telescope turns, the edge of the dome slot will eventually interfere with the view, thus requiring the dome to be turned. The turning may be done manually, or by electric motors activated by manually operated switches or under computer control. It is contemplated that the system described herein will find its greatest utility in connection with smaller domes and associated control systems that are directed toward small scale research applications but the system is not limited to such uses.

Providing a dome that can be automatically operated would eliminate the time and trouble needed to manually control the dome rotation and also allow for continuous viewing of the heavens on a long term basis, say an entire evening, without the viewer having to go out to the dome at intervals throughout the night in order to keep the dome aperture in constant alignment with the telescope.

The electronic dome rotation system described herein permits the automatic operation of the telescope observatory dome as the telescope is directed to different objects, or while it tracks one object as the earth rotates. The invention does not use complex computer control, but instead, relies on infrared sensors in connection with the telescope field and as the sensors detect the appearance of an edge (of the dome) in front of the telescope they, in turn, operate relays in connection with the operation of the dome in order to recenter the dome slot in front of the telescope.

SUMMARY OF THE INVENTION

The invention is a system for controlling the operation of a dome in connection with a telescope in order to maintain the slot of the dome in alignment with the telescope at all times so that stars may be viewed continuously. The system eliminates or minimizes the need for the user having to manually control the operation, usually rotation, of the dome. Preferably four infrared sensors and transmitters are mounted along the circumference of the telescope in order to send signals to a controller when the edge of the dome is detected which occurs when the signal is reflected back to the sensor. Each of the sensors should be 90° in relation to each other. Each of the detectors is in connection with a controller. The controller is in connection with the movement system of the dome and sends signals to the movement system that rotate the dome until the sensors determine that the dome slot is aligned with the telescope.

If the telescope is on an altazimuth mounting the telescope most move in both the altitude (up/down) and azimuth (horizontal/circle) to follow the star. If the telescope is on an equatorial mounting, the telescope need only be rotated around a single polar axis to follow the star. A telescope on an equatorial mounting will rotate relative to the earth and to the dome slot as it follows the star. The controller has a means for determining the down direction as the equatorial telescope rotates on its axis while following the stars, thus enabling the controller to determine which sensors correspond to the left and right slot edges. There are also verification systems in the sensors and the controller that provide that the reflected signal must be detected for a certain time period and that the clear signal must be detected for a certain time period before a signal is sent to the controller.

It is an object of the invention to control the operation of a dome having a slot that is in connection with a telescope in order to maintain the slot in constant alignment with the telescope throughout the viewing period.

It is an objective of the invention to provide the advantages of automated dome operation in connection with a telescope in a self-contained system.

It is another objective to provide a telescopic dome rotation system that can be installed on any dome having electric rotation in order to automate the dome rotation process.

Another objective is to use infra-red sensors in a dome control system in order to eliminate or minimize interference with the astronomical instruments as may arise from alternative dome control systems.

Another objective is to provide an automatic dome movement system in order to maintain the slot of such dome in alignment with the telescope even if the telescope slews.

Other objectives will be seen by those skilled in the art once the invention is shown and described.

DESCRIPTION OF THE PREFERRED EMBODIMENT

Figure 1:
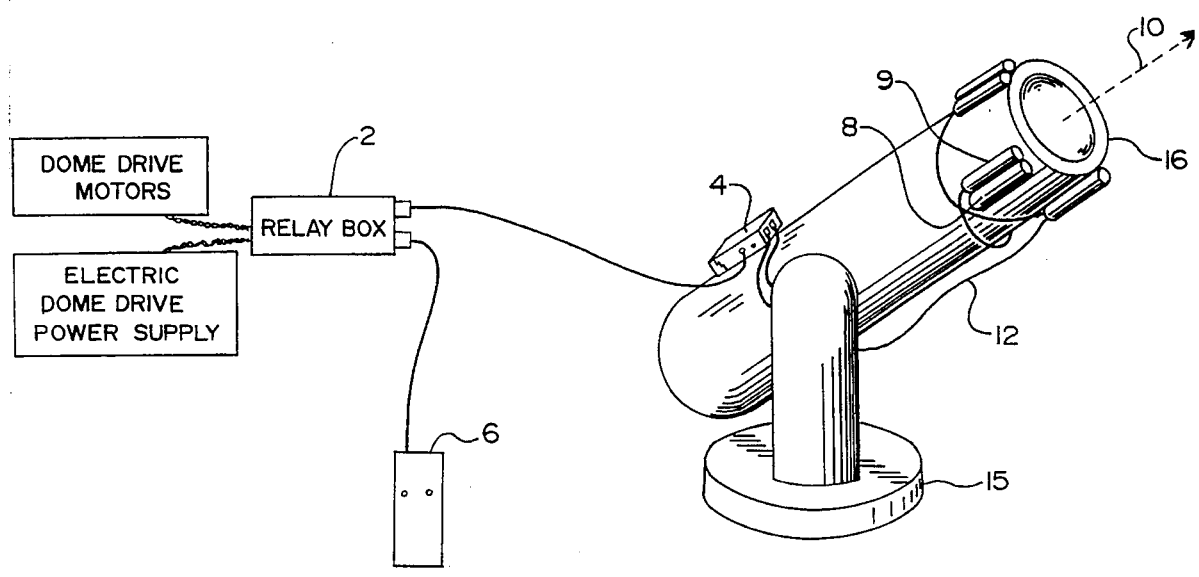
FIG. 1 Overall operating components of the system.

FIG. 1 shows the overall setup of the typical installation. The controller is mounted on the telescope tube so that a built-in artificial horizon device within the controller can sense the orientation of the telescope relative to the earth. Sensor pods are mounted at the outward end of the telescope tube at 90 degree intervals around the telescope tube and are connected in pairs to the controller. The output of the controller drives a relay box or other device that controls the movement of the dome's electric drive motors. It is preferred that the controller and sensor pods receive their operating power from the relay box and dome drive power supply.

The dome rotation system is shown in FIG. 1. There are four sensor pods on the telescope each having an infrared (IR) transmitter and a receiver in connection therewith. The sensor pods should be mounted around the outside circumference or the outer surface of the housing the telescope as shown. Thus, when the telescope is seen from the front one sensor pod will be at the top of the housing (i.e. 12 O'Clock to the viewer), one at the bottom (6 O'Clock), one on the left and one on the right (3 O'Clock and 9 O'Clock). The sensor pods are connected to one another in pairs so that those on the top and bottom should operate as one pair and those on the left and right should be connected to one another in order to operate as a second pair.

It is helpful to think of the telescope as having a housing that is of a tubular construction and having a viewing line or axis that defines the line along which the light from the heavens comes into the telescope. The construction of the housing of the telescope defines a tube that runs parallel to this line, and the sensor pods should be mounted on the outer surface of the tubular shaped housing of the telescope.

Figure 2:
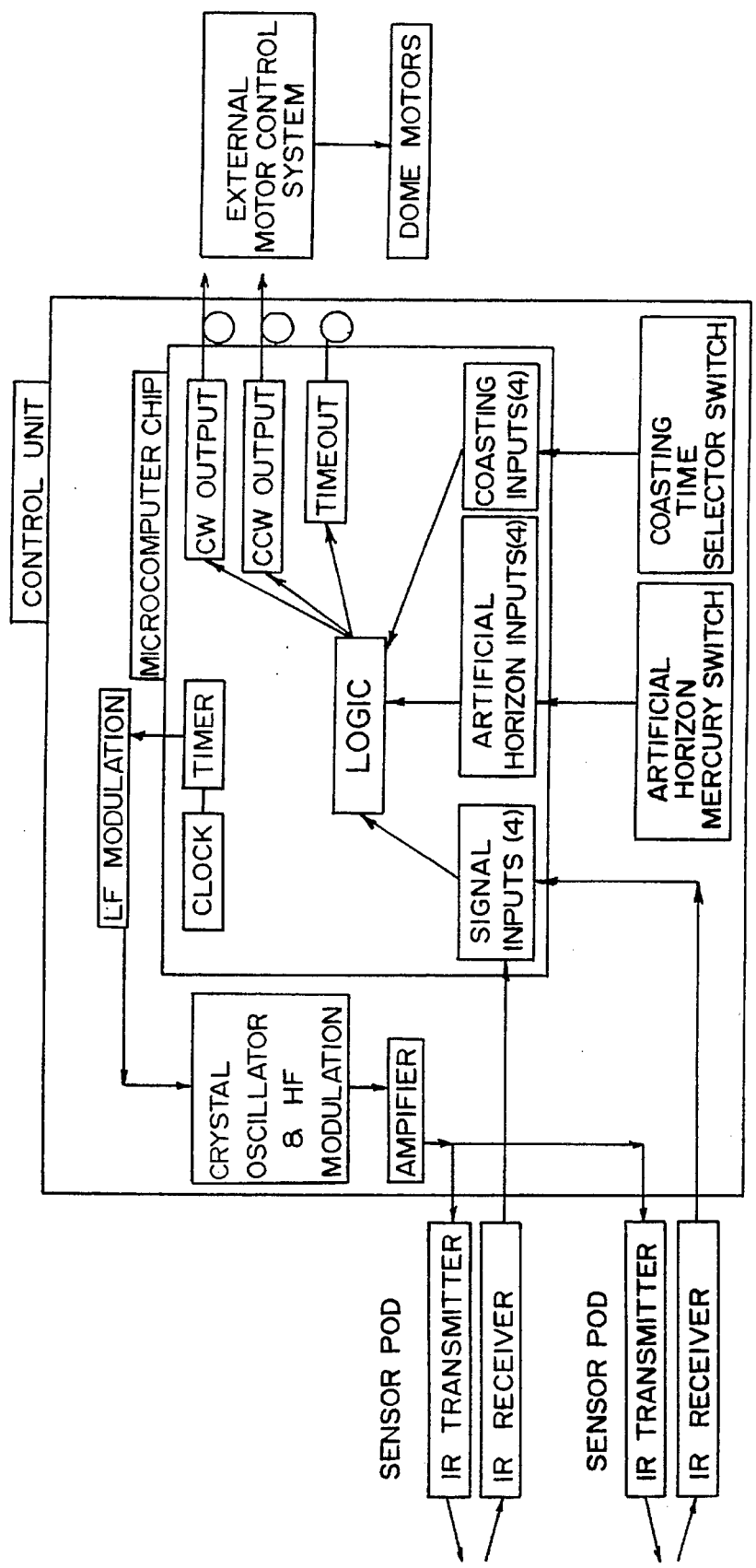
FIG. 2 flow diagram of operation of pods, controller, and dome control system.

FIG. 2 shows a block diagram of the controller-related components. The controller contains an artificial horizon, and an oscillator and a pre-programmed microcomputer that processes signals sent by the sensors indicating that the interior wall of the dome is in front of that particular sensor pod. The controller sends output signals to the dome motor control relays to control the movement of the dome. The controller also contains small indicator lights to show the operation.

The controller section of the system is preferably mounted at or near the top of the telescope and controls the operation of the working parts of the dome by sending signals to the relay box shown in FIG. 1 in order to rotate the dome in response to signals (indicating the presence or absence of IR) sent to the controller by the sensor pods. The controller has a built in artificial horizon that determines which of the sensor pods is on the top of the scope and therefore which of the sensor pods is at the left and which is at the right. The controller will then use a logic system in connection therewith to select which of the pods corresponds to the left and right sides of the shutter opening and can then determine which direction to rotate the dome in order to maintain the slot in alignment.

The system herein described can be used on telescopes equipped with either altazimuth mounts (e.g. Dobsonians) or on equatorial mounts. In an altazimuth installation, only two infra-red sensor pods are needed to detect the left and right edges of the dome slit using a sensor pod on opposite sides of the telescope (each sensor pod combines both a transmitter and receiver). However, a telescope on an equatorial mount will rotate once each day, relative to the earth surface, as it follows the sky. Thus, after tracking an object for six hours (or moving to an object six hour angles away) the telescope will have rotated 90 degrees. A sensor pod on the telescope that was properly aimed at the right side of the slit, will now sense the top or bottom of the slit, thus giving incorrect guidance to the observatory drive motors. To correct for this effect, the astronomer can manually change the sensor pod orientation on the scope (e.g., move them to the correct left/right position on the scope tube). Of course, this requirement for manual adjustment reduces the degree of automation available.

However, using the four infrared sensor pods located at 90 degrees around the telescope and the information from the artificial horizon, the controller uses an internal logic table to detect the sensor pod corresponding to the left and right directions and the proper direction to turn the dome when a particular sensor pod is activated.

The artificial horizon may be for example, a four pole mercury switch. Because the switch is attached to the controller and telescope, it will rotate as the telescope is rotated. The mercury switch will output voltage onto the lowest one or two of the four switch poles, thus indicating the orientation of the sensor pods i.e. which pod is on the bottom and hence which is on the top, which is the left, which is the right.

The controller preferably has an internal memory which will keep track of that direction (clockwise or counterclockwise) the dome was previously moving in the event that the telescope moves all the way out of the slot. In that event, both left and right sensor pods will presumably send a signal to the controller, the controller in turn will send signals to the control system to continue turning the dome until the slit is aligned with the telescope. At that time, the sensor pods will send signals to the controller to indicate that this condition has occurred, we refer to this as a "clear" signal for purposes of convenience. The controller may include an automatic timer that will limit its operation of the dome to a nominal 100 seconds to prevent unnecessary wear in the dome drive if the telescope should be stuck in a continuous slewing operation.

Each telescope-mounted sensor pod has its own built-in transmitter and receiver for infrared radiation. Both the transmitter and the receiver should have a lens. That lens on the transmitter can focus the IR beam and that on the receiver can increase the sensitivity of the receiver to the reflected IR beam. IR may be transmitted into a small spot, preferably about 1 inch at four feet, to minimize scattered infrared. When the dome slot is in front of the telescope, infrared is projected out the slot. No infrared is reflected back except when the slot edge moves into the infrared sensor field of view. The sensor pods will detect the slot edges of most domes at a distance of about 7–10 feet. Because the sensor pods should be located on the end of the telescope, domes of most any size can be controlled with this system. No special treatment of the dome edges is needed. As noted, the sensor pods respond to most materials in the 7–10 foot range, and adjustment is normally not needed. Sensor sensitivity may be adjusted by the user by changing the power level for the IR transmitter. Sensor pods may be focused in order that lower power levels of radiation may be used.

Although constructed together as a unit, each pod component is optically isolated from the other. The transmitter is an infrared emitting diode with a lens to focus the IR beam. The receiver component of the pod consists of a lens which focuses the reflected IR onto a modular IR detector. It is preferred that the detector respond to IR that is primary modulated at approximately 32 kHz, with a second low frequency modulation of about 700 Hz superimposed. Because of the detector characteristics, the controller includes a special oscillator and amplifier that produces 32 kHz, and which is in turn shut off and on at about 700 Hz by the microcomputer. The result is that 32 kHz IR is emitted in bursts lasting about 700 us.

It may be important to reduce the power levels of IR used in order to minimize the chances of reflected IR interfering with the telescope observation due to the fact that some IR may be reflected by the dome in the direction of the telescope objective area. Focusing, increasing sensitivity levels and using doubly modulated IR radiation may all contribute to decreasing power levels of IR. Doubly modulated IR (using frequency and/or amplitude modulation of the IR signal) allows the sensor pod to receive lower levels of IR.

It is preferred that the IR beam used be a relatively small focused beam. If the beam is too small local reflection variations on the inner dome surface may cause the reflected IR not to reach the detector. Commonly, a too large beam reduces sensitivity in detecting the slot edge. The same would be preferred when other types of electromagnetic radiation sensors are used. The use of doubly modulated infrared light allows a high sensitivity without using high power levels.

The relay box uses the signals from the system controller to control the dome drive motors to turn the dome clockwise or counterclockwise.

The system automatically turns the observatory dome to keep the dome opening (slot) in front of the telescope while the user moves the telescope (by hand or automatic control). This avoids the need for manual operation of the dome, and is useful for long time exposures, for remote control of the telescope, or for quick viewing different parts of the sky.

Figure 3:
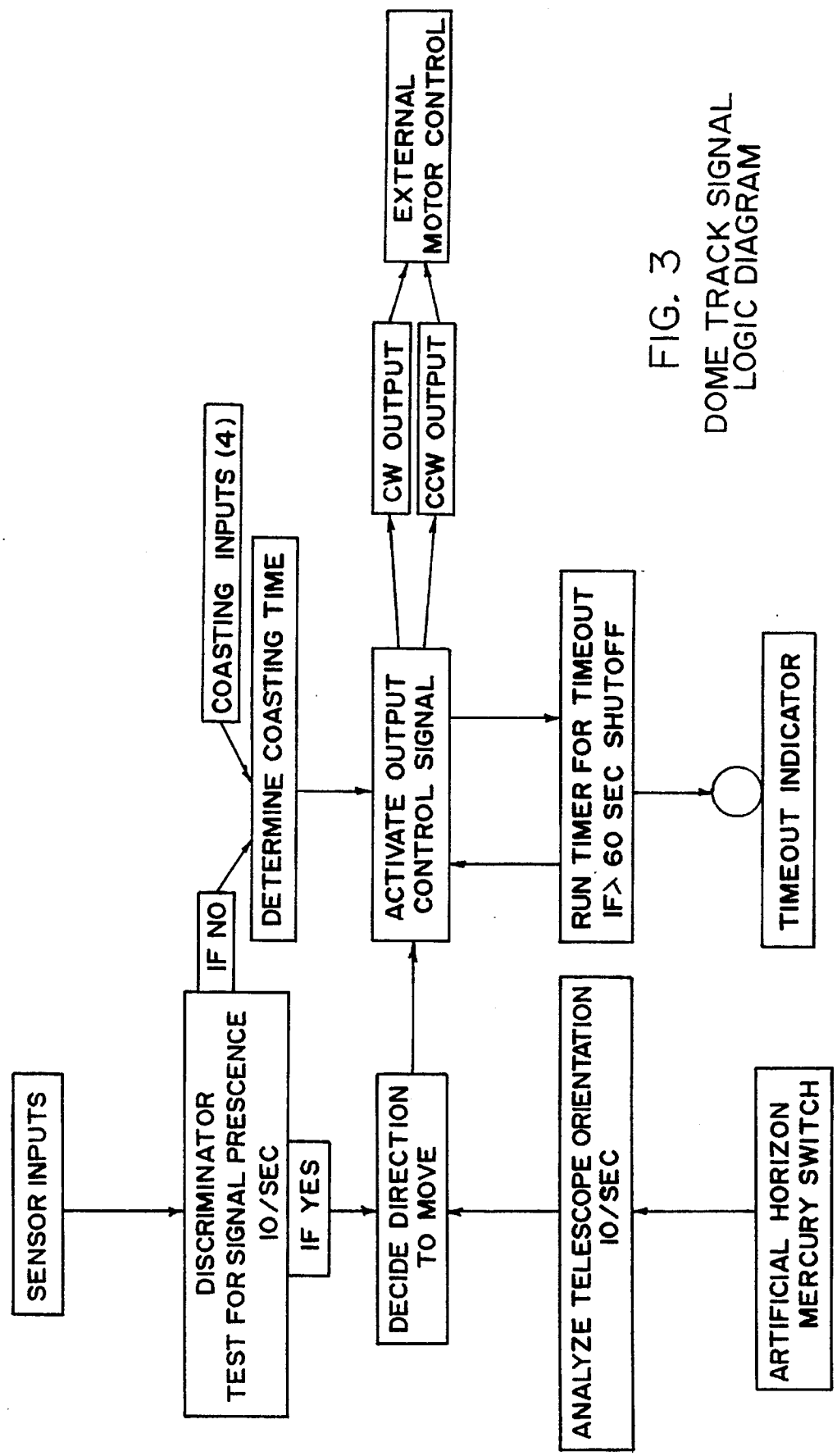
FIG. 3 logic process used by controller.

As the telescope moves so that the slot edge interrupts and reflects a portion of the transmitted IR, the modular detector begins to send a signal to the signal input of the microcomputer. As shown in FIG. 3, the microcomputer applies discrimination logic to determine whether the signal is to be considered a valid slot edge detection. For example, in the present embodiment, the logic requires that the signal be present for at least two seconds before being considered a valid slot edge detection (this discriminates against birds outside the slot).

The controller then determines what the location of the sensor pod was that sent the signal i.e. whether this was the left, right, top or bottom sensor. The controller can do this by means of an artificial horizon previously described. With this information, the preprogrammed microcomputer then determines which way to move the dome in order to move the slot edge away from the IR beam.

Once the logic decides on the proper direction to turn the dome, i.e., clockwise or counterclockwise, the microcomputer activates the proper output, sending a control signal to the relay control device that controls the operation of the dome.

As the dome turns, the slot edge will move away from the IR beam, thus decreasing the reflected IR and reducing the detected signal. The discriminator applies logic tests to determine when there is a valid "slot edge gone" detection, for example, by requiring the signal to drop to zero for at least one second (to guard against short signal dropouts from any source, including variations in the reflectivity of the internal dome materials). Once a valid detection is made that the slot edge is no longer in the IR beam, the logic then continues to operate the dome for a "coasting" period. This period is selectable by the user to so that the dome will rotate the slot opening to a position centered in front of the telescope.

As the dome is turning, the controller also keeps count of how long the dome has been turning. If the dome has turned continuously for more than 100 seconds, the logic shuts down the dome rotation. This assures that the dome does not continue to operate indefinitely if some failure should occur in the system. This timeout feature resets by removal and reallocation of power to the system, or if the valid detection of "slot edge gone" is made.

An important feature of the system logic in the controller is that the detectors will sense not only the slot edge, but in fact detect any portion of the inside surface of the dome. Thus, if the telescope slews faster than the dome turns, the logic in the controller will keep a record of which direction to continue turning until the slot opening rotates into alignment with the sensors. In addition, if the system (controller and sensors) is first turned on with the telescope and pods facing an internal surface of the dome, i.e., away from the slot opening, the system will automatically begin turning the dome until it "finds" the slot (or until the timeout is complete).

The system may also include a handheld control that overrides the operating system in order to allow for manual control of the dome. The connection of the controller with the dome control systems may be by various means including direct wire connection, electromagnetic radiation, light, or ultrasonic signaling. Any state of the art system may be used to power the IR transmitters/receivers as well as the controller.

The use of infrared energy with the sensors is believed to be the preferred method of detecting the dome and the slot; however, other types of electromagnetic radiation may be used without varying from the spirit of the invention. Such light emitters may include: visual light emitters, lasers, etc. Other energy systems that utilize focused beams of energy may be used, such as units that send and/or receive ultrasonic signals.

Alternative detection systems also are feasible, in which different modulation and or phase sensitive detection is used. Such alternative systems may offer some advantages (e.g., of increased sensitivity and lower IR power use). The logic component in the controller may be any state of the art means. It is believed that a microcomputer may be the preferred logic component but other systems such as those that are hard wired may be used without varying from the spirit of the invention.

The present system uses four transmitter-receiver pods at the 90 degree points of the telescope tube to provide for tube rotation of an equally mounted telescope. Alternative arrangements are feasible. These include use of a single pair of sensors (pods) that may be rotated, either manually or automatically, in order to maintain proper left-right orientation. Other methods may be used for moving the transmission-reception sensors around the telescope tube.

I claim:

1. An automated operating system for a celestial dome and telescope system comprising: a telescope having a viewing axis along which a view of the heavens may be obtained, said telescope having a housing of a tubular nature that runs parallel to said viewing axis, a dome having an aperture and a dome control system having a means for rotating said dome in order to maintain said aperture in alignment with said viewing axis so that said heavens may be viewed, said dome control system having at least one sensor unit comprising a transmitting means in connection with said telescope for propagating electromagnetic radiation in close association with said viewing axis, and a means for detecting the presence of reflected electromagnetic radiation, said at least one sensor unit having a means to send a detection signal in response to detecting the presence of said reflected electromagnetic radiation and a means for sending a clear signal in the event said reflected electromagnetic radiation is not detected, a controller for receiving said detection and clear signals, said controller in connection with said dome control system, said controller having a means to send control signals to said dome control system in order to move said dome until said controller receives a clear signal.

2. The system of claim 1 wherein said electromagnetic radiation comprises infrared radiation.

3. The system of claim 1 wherein said infrared radiation is doubly modulated.

4. The system of claim 1 having at least two sensor units located at about a 180° interval around said housing.

5. The system of claim 4 having at least four sensor units located at about 90° intervals around said housing; said sensor units being grouped in pairs, each sensor unit in said pair located at about 180° interval from said other said sensor unit in said pair; said controller having a horizon means for determining and keeping a record of the position of said sensor units in relation to said housing; and a logic means for determining a direction to move said dome in order to eliminate the presence of said detection signal.

6. The system of claim 5 wherein said horizon means comprises a mercury switch having four poles located at 90° intervals from one another and having a means for sending a signal to said controller indicating which of said sensor units is bottommost, said controller having a memory means for determining the locations of the other sensor units upon determining which of said sensor units is bottommost.

7. The system of claim 1 wherein said controller has a timing means in connection therewith for limiting the amount of time that said control signal operates said dome control system.

8. The system of claim 1 wherein said at least one sensor unit has a verification means in connection therewith for determining that said reflected signal has been received for a certain time period and for delaying said detection signal until said time period has been reached.

9. The system of claim 8 wherein said at least one sensor unit has a second verification means for determining that said return signal has not been received for a certain second time period and for delaying said clear signal until said second time period has been reached.

10. The system of claim 1 wherein said transmitting means has a means for focusing a beam of electromagnetic radiation.

11. The system of claim 1 wherein said transmitting means has a manual controller for adjusting the power level of said electromagnetic radiation.

* * * * *